Feb. 7, 1928.
W. H. WINEMAN
1,658,319
VALVE CONTROLLING MECHANISM
Filed Dec. 11, 1924
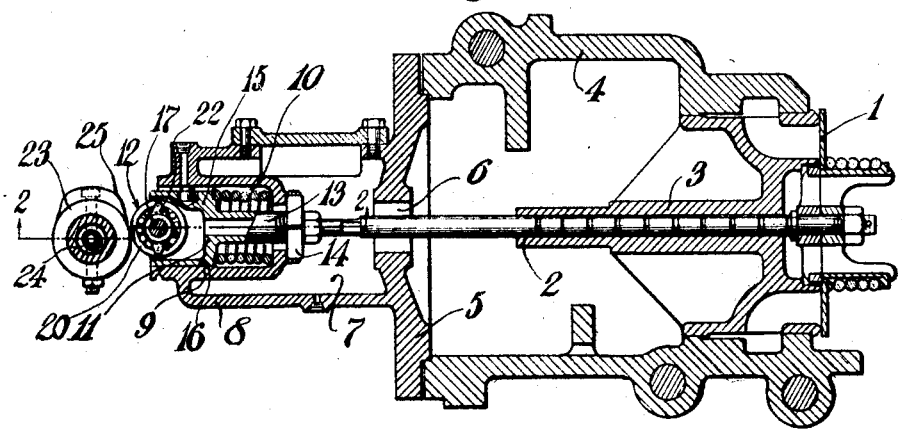
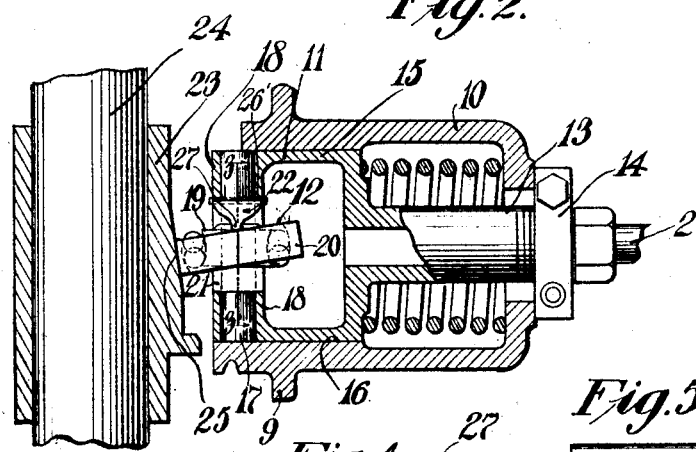
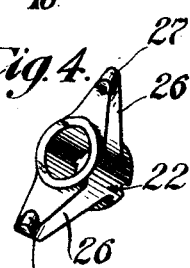
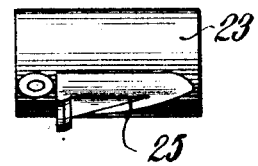
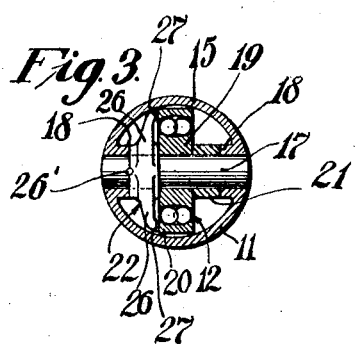
Inventor:
Wade H. Wineman
by
Atty.

Patented Feb. 7, 1928.

1,658,319

UNITED STATES PATENT OFFICE.

WADE H. WINEMAN, OF MICHIGAN CITY, INDIANA, ASSIGNOR TO SULLIVAN MACHINERY COMPANY, A CORPORATION OF MASSACHUSETTS.

VALVE-CONTROLLING MECHANISM.

Application filed December 11, 1924. Serial No. 755,351.

This invention relates to a valve controlling mechanism.

It has for its object to provide an improved valve controlling mechanism. A further object is to provide an improved cam follower. In certain types of cams the same are shifted longitudinally along the axis about which they rotate and have a cam surface angularly disposed to the longitudinal axis thereof. When said cam is shifted and while the follower remains in a relatively fixed position on its supporting base, varied degrees of maximum movement of the valve will result. Such a mechanism is particularly adapted for steam engines to control the inlet valve, although it will be readily understood that the same is applicable to any device where cams are used. In a cam as above described, the cam surface will at times be angularly disposed to the path of movement of the valve actuating rod and accordingly the contacting surface of the cam follower must, in order to have an adequate bearing surface thereon, be inclined according to the inclination of the contacted portion of the cam surface. As this cam surface will continuously vary from a position which is parallel to the longitudinal axis of the cam to an inclined position relative thereto, it will be seen that the surface of the cam follower must also vary accordingly in order to keep a sufficient contact with the cam. Such an action will impart an oscillating movement to the follower. It is another object of the invention to provide improved means for guiding the cam follower during oscillation. The cam follower herein comprises a ball bearing of the so called self-alining type which has an outer race adapted to swing about the center of the inner race. More specifically, it is the object of the invention to provide improved means to restrain the outer race, which constitutes the cam follower, from moving in a plane which is disposed transversely of the axis of the valve stem but which will permit said follower to have any other desired and necessary movements.

In the accompanying drawings I have shown for purposes of illustration one form which my invention may assume in practice.

In these drawings,—

Fig. 1 is a longitudinal section through a valve mechanism showing the cam in end elevation.

Fig. 2 is an enlarged fragmentary detail of the cam and follower mechanism attached to the lower end of the valve stem taken on line 2—2 of Fig. 1.

Fig. 3 is a sectional view on line 3—3 of Fig. 2.

Fig. 4 is a perspective of the improved cam follower support.

Fig. 5 is a detail of the cam.

In the illustrative embodiment of my invention I have shown the same in connection with a valve 1 adapted to be supported by a usual valve stem 2 reciprocably guided by a hollow sleeve 3 carried by a suitable housing 4. This housing could be a suitable portion of an engine if desired. Disposed on the end of said housing is a plate 5 having an aperture 6 through which the stem 2 passes into a chamber 7 formed by walls 8 projecting from the plate 5. Disposed within the chamber 7 and carried by a transverse wall 9 is a hollow member 10 adapted to receive a support 11 for a cam follower generally indicated at 12. More specifically the member 11 comprises a hollow stem 13 to which the valve stem 2 is attached by a suitable collar 14. Formed on the outer end of the stem 13 is a cylindrical hollow member 15 adapted to be non-rotatably and reciprocably guided by a bearing portion 16 formed in the member 10. As shown in Figs. 2 and 3, a pin 17 extends through bosses 18 formed on the inner side of the member 15. Disposed on said pin is a cam follower 12 which comprises herein a ball bearing having an inner race 19 and an outer race 20, the center of the radius of curvature of the outer ball race coinciding with the center of the inner race which permits movement of the outer member in any direction desired. This type of bearing is usually known as a self-alining bearing and does not per se form a part of the invention herein. A spacing collar 21 is disposed on one side of the race 19 while my improved outer race support generally indicated at 22 is disposed on the other side.

In order to appreciate the advantages of my improved support, it will be noted that the outer race 20 which forms the cam follower is adapted to cooperate with a cam 23 rotatable about and longitudinally movable along the axis of a shaft 24. This cam has an inclined surface 25 formed eccentrically with respect to the shaft axis, as clearly shown in Fig. 5, and is adapted upon longitudinal movement to present varying degrees of eccentricity to the cam follower, thereby varying the amount of valve movement. It will be clear, however, that upon rotation of the cam, if the follower is to have a maximum bearing surface thereon, the follower must rotate about a transverse axis to a position as shown in Fig. 2. During rotation of the cam the follower will oscillate about the transverse axis due to the varying inclinations of the cam surface. Thus it will be seen that if some means is not provided the follower will, during these short oscillations, be liable to be moved out of operative relation to the inner race 19. To prevent this my improved follower support is used, which specifically herein comprises as shown in Fig. 4 opposite radially extending arms 26 carried by a suitable central boss adapted to be mounted on the pin 17 and held in rigid relation with respect to the member 15 and the pin by means of a transverse pin 26'. The follower support further has small bearing lugs 27 projecting parallel to the axis of the pin 17 and so positioned as to engage only the outer race 20 as shown in Figs. 2 and 3. Thus it will be seen that during oscillation of the cam follower the same will tend to pivot about the bearing lugs 27 and will thus be effectively held in operative relation to the inner race 19.

While I have herein shown only one cam follower support, it will of course be understood that two of the same could be used by disposing one on each side of the cam follower. The bearing lugs 27 if formed with rounded bearing surfaces could be slightly spaced from the bearing in order to allow sufficient oscillation thereof. It will of course be understood that any form of bearing surface on the lugs 27 could be used such as a knife edge, a sphere, a point, or the like.

While I have in this application specifically described one form which my invention may assume in practice, it will be understood that this form of the same is shown for purposes of illustration and that the invention may be modified and embodied in various other forms without departing from its spirit or the scope of the appended claims.

What I claim as new and desire to secure by Letters Patent is:

1. In combination, a rotary cam having a surface whose trace on a plane including the axis of rotation of said cam departs from a line parallel to said axis, a rotary cam follower adapted to engage said cam on rotation of said cam and means for pivotally mounting said cam follower for oscillation about an axis perpendicular to its axis of rotation, and guiding means wholly independent of said cam for engaging said rotary cam follower to prevent bodily movement thereof in a certain direction without interfering with rotation thereof.

2. In combination, a rotary cam having a surface whose trace on a plane including the axis of rotation of said cam departs from a line parallel to said axis, a ball bearing having the outer race forming a cam follower adapted to cooperate with said cam, and means separate from the balls of said bearing and wholly independent of said cam for guiding the outer race.

3. In combination, a rotary cam having a surface whose trace on a plane including the axis of rotation of said cam departs from a line parallel to said axis, a roller engageable with said cam, a member to be actuated, means for supporting said roller on said member for oscillation on an axis substantially perpendicular to its axis of rotation, and guiding means wholly independent of said cam for engaging the roller substantially at its axis of oscillation.

4. In combination, a cam, a roller engageable with said cam, a member to be actuated, and means for pivotally supporting said roller on said member for tilting to a plurality of positions, the axis of rotation of the roller in one position being angularly disposed with respect to the axis of rotation of the roller in another position, and guiding means independent of said cam and engaging said roller at a plurality of points in a line perpendicular to its pivotal axis and at opposite sides thereof to prevent bodily movement thereof in a certain direction without interfering with rotation thereof.

5. In combination, an oscillatory rotatable cam follower, a longitudinally movable cam for actuating the same, and means for engaging the side of said follower permitting tilting of the latter about an axis transverse to its axis of rotation, said engaging means being disposed on the side thereof in which said cam would subject the same to the greatest displacement force during longitudinal movement.

6. A guide for the outer race of a self-alining bearing of the type which comprises inner and outer races related in a manner permitting angular change in the plane of one relative to that of the other, said support comprising journal means for the outer race and auxiliary means for guiding said race to prevent bodily movement thereof in a certain direction while permitting tilting thereof.

7. A guide for the outer race of a self-alining ball bearing adapted to permit substantially free rotation of the latter comprising means for contacting said race laterally in a plane passing through the axis of said race.

8. A guide for a self-alining ball bearing which comprises relatively stationary and freely rotatable races, said guide including means for engaging the freely rotatable race of said bearing at a lateral point about which the same may pivot.

9. A guide for a rotatable cam follower, said guide comprising an element having a portion extending radially with respect to the axis of rotation of said cam follower when said axis is parallel to the axis of movement of said cam, said element having means providing a fulcrum for said cam follower disposed for engaging the side thereof.

10. A guide for rotatable cam follower, said guide comprising members extending oppositely radially with respect to the axis of said cam follower when said axis is parallel to the axis of rotation of said cam, said members having bearing lugs disposed on the outer ends thereof to engage the side of the cam follower.

In testimony whereof I affix my signature.

WADE H. WINEMAN.